US010638260B2

(12) United States Patent
Schwarzer et al.

(10) Patent No.: US 10,638,260 B2
(45) Date of Patent: Apr. 28, 2020

(54) SYSTEM AND METHOD FOR INITIATING COMMUNICATION WITH A SHORT RANGE TRANSCEIVER

(71) Applicant: Unwire Payments & Mobility ApS, København Ø (DK)

(72) Inventors: Jens Johan Schwarzer, Frederiksberg (DK); Jeppe Leth Nielsen, København N (DK); Anders Christian Svendsen, København NV (DK)

(73) Assignee: UNWIRE PAYMENTS & MOBILITY APS, København Ø (DK)

( * ) Notice: Subject to any disclaimer, the term of this patent is extended or adjusted under 35 U.S.C. 154(b) by 0 days.

(21) Appl. No.: 15/761,668

(22) PCT Filed: Oct. 3, 2016

(86) PCT No.: PCT/EP2016/073560
§ 371 (c)(1),
(2) Date: Mar. 20, 2018

(87) PCT Pub. No.: WO2017/060194
PCT Pub. Date: Apr. 13, 2017

(65) Prior Publication Data
US 2018/0352377 A1 Dec. 6, 2018

(30) Foreign Application Priority Data
Oct. 5, 2015 (EP) ..................................... 15188436

(51) Int. Cl.
H04B 7/00 (2006.01)
H04W 4/02 (2018.01)
(Continued)

(52) U.S. Cl.
CPC .......... *H04W 4/023* (2013.01); *H04B 5/0031* (2013.01); *H04B 5/0075* (2013.01); *G01V 3/08* (2013.01); *H04W 4/80* (2018.02)

(58) Field of Classification Search
CPC ... H04B 5/0031; H04B 5/0075; H04W 4/023; H04W 4/80; G01V 3/08
(Continued)

(56) References Cited

U.S. PATENT DOCUMENTS 7,280,975 B1 * 10/2007 Donner .................. G06Q 10/02
235/382
7,386,517 B1 * 6/2008 Donner .................. G06Q 10/02
705/14.14
(Continued)

FOREIGN PATENT DOCUMENTS

EP 2 355 563 A1 8/2011
EP 2355563 A1 * 8/2011 .......... H04W 12/003
(Continued)

OTHER PUBLICATIONS

International Search Report (PCT/ISA/210) dated Mar. 20, 2017, by the European Patent Office as the International Searching Authority for International Application No. PCT/EP2016/073560.
(Continued)

*Primary Examiner* — April G Gonzales
(74) *Attorney, Agent, or Firm* — Buchanan Ingersoll & Rooney P.C.

(57) ABSTRACT

Disclosed is a method, a computer program application, and a system for initiating communication, the system including at least one radio transceiver configured for short range communication, a proximity component and a computer program application provided in an external device, the radio transceiver being configured to communicate with the computer program application, and the proximity compo-
(Continued)

nent being configured to be identified by the external device, wherein the external device upon identifying the proximity component is configured to initiate communication with the radio transceiver enabling exchange of data verifying one or more electronic objects associated with the user or the computer program application or the external device.

19 Claims, 11 Drawing Sheets

(51) Int. Cl.
  *H04B 5/00* (2006.01)
  *G01V 3/08* (2006.01)
  *H04W 4/80* (2018.01)
(58) Field of Classification Search
  USPC ........................................................ 455/41.2
  See application file for complete search history.

(56) References Cited

U.S. PATENT DOCUMENTS

| | | | | |
|---|---|---|---|---|
| 7,415,424 | B1* | 8/2008 | Donner | G06Q 10/02 |
| | | | | 705/5 |
| 7,562,028 | B1* | 7/2009 | Donner | G06Q 10/02 |
| | | | | 705/5 |
| 7,562,051 | B1* | 7/2009 | Donner | G06Q 10/02 |
| | | | | 705/5 |
| 7,747,223 | B2* | 6/2010 | Wilson | H04M 1/7253 |
| | | | | 455/67.11 |
| 9,859,953 | B2* | 1/2018 | Johnson | H04W 4/21 |
| 2002/0137552 | A1 | 9/2002 | Cannon et al. | |
| 2012/0045994 | A1* | 2/2012 | Koh | H04L 63/0492 |
| | | | | 455/41.3 |
| 2014/0001263 | A1 | 1/2014 | Babu et al. | |
| 2015/0081474 | A1* | 3/2015 | Kostka | G06Q 30/0633 |
| | | | | 705/26.8 |
| 2015/0190053 | A1* | 7/2015 | Baker | H04W 76/10 |
| | | | | 340/870.3 |
| 2015/0332248 | A1* | 11/2015 | Weksler | G06Q 20/3226 |
| | | | | 705/71 |
| 2015/0358423 | A1* | 12/2015 | L'Heureux | G06Q 20/3224 |
| | | | | 705/21 |
| 2017/0004475 | A1* | 1/2017 | White | G06Q 20/204 |

FOREIGN PATENT DOCUMENTS

| | | |
|---|---|---|
| EP | 2 837 104 A1 | 2/2015 |
| WO | 2013/155122 A1 | 10/2013 |

OTHER PUBLICATIONS

Written Opinion (PCT/ISA/237) dated Mar. 20, 2017, by the European Patent Office as the International Searching Authority for International Application No. PCT/EP2016/073560.

Extended European Search Report dated Jul. 5, 2016, issued by the European Patent Office in the corresponding European Patent Application No. 15188436.8-1853. (14 pages).

Jin, Rong, et. al., "MagPairing: Exploiting Magnetometers for Pairing Smartphones in Close Proximity", Conference on Communications and Network Security, pp. 445-453, Oct. 29, 2014, XP032714658.

Office Action (Communication pursuant to Article 94(3) EPC) dated Dec. 4, 2019, by the European Patent Office in corresponding European Application No. 16 787 739.8-1213, (8 pages).

* cited by examiner

| Timestamp in milliseconds | Magnetic field strength in microtesla |
|---|---|
| 1432210429974 | 33 |
| 1432210430034 | 35 |
| 1432210430094 | 38 |
| 1432210430154 | 60 |
| 1432210430214 | 81 |
| 1432210430274 | 120 |
| 1432210430334 | 355 |
| 1432210430394 | 878 |
| 1432210430454 | 1245 |
| 1432210430514 | 1354 |
| 1432210430574 | 1345 |
| 1432210430634 | 1399 |

50

51 — In the computer program application, receiving proximity information when an external device and/or the computer program application is in proximity to the proximity component 52 — initiate communication, upon receiving proximity information, between the computer program application and the radio transceiver of the system 53 — enable exchange of data between the external device and the radio transceiver verifying one or more electronic objects associated with the user or the computer program application or the external device

Fig. 7

SYSTEM AND METHOD FOR INITIATING COMMUNICATION WITH A SHORT RANGE TRANSCEIVER

TECHNICAL FIELD

The present invention relates to a method, a computer programmable application and a system for initiating communication with a short range transceiver. The system comprises at least one radio transceiver configured for short range communication and a proximity component, the proximity component being configured to be identified by the external device before initiating communication with the transceiver.

BACKGROUND

Wireless technology is being used in an increasing number of situations, not only for long range telecommunication applications, but also for short range communication in which for example Bluetooth transceivers are used to communicate with user devices, such as mobile phones, smart devices, such as smart phones etc. Short range wireless technology is for example widely used for enabling hands free communication in a car, enabling wireless use of electronic devices, including computers, tablets, mobiles phones, etc. in a home or work setting, connecting printers to computers etc. Short range wireless technology is also used for file swapping, music sharing, collaborative gaming, etc.

However, short range communication is also increasingly used in public spaces, not only for creating hot spots, but also for communication with users in the immediate surroundings of a wireless transceiver, for example for sending notes and messages to costumers in a grocery store, for sending offers tailored to users in the local area, including lunch offers, special deals etc. Furthermore, Bluetooth may be used between devices to find other people near you, or it may be used to locate lost items having a tracking device attached thereto, such as beacon stickers, for example using the Bluetooth tiles or StickNFind beacon tags.

For establishing a secure connection between two devices, different approaches have been suggested, and typically user interaction is needed to obtain a secure short range wireless connection between two devices. Another example includes MagPairing, in which two mobile phones are brought into contact with each other, so that both magnetometers of the mobile phones may read the magnetic field emitted from the other, which yields highly correlated sensor data of magnetic field patterns. The sensor data may then be used to authenticate or establish security keys to prevent man-in-the-middle attacks.

For some personal communication applications, it may be desired to provide specific proximity zones, to interact with short range wireless devices only within a specified proximity zone. It is however a challenge for the known wireless short range communication protocols to provide robust proximity zones.

Thus, for such applications typically other approaches are used such as NFC technologies or other near-field technologies.

SUMMARY

It is an object of the present invention to provide a system and a method overcoming some of the above disadvantages.

In accordance with a first aspect of the present invention, a system for initiating communication with an external device is provided. The system comprises at least one radio transceiver configured for short range communication, a proximity component and a computer program application provided in an external device, the radio transceiver being configured to communicate with the computer program application, and the proximity component being configured to be identified by the external device. The external device is configured to initiate communication with the radio transceiver upon identifying the proximity component. Initiating communication with the radio transceiver may for example enable exchange of data verifying one or more electronic objects associated with the user, enable exchange of data verifying one or more electronic objects associated with or the computer program application, and/or enable exchange of data verifying one or more electronic objects associated with the external device.

In accordance with a further aspect of the present invention a system for initiating communication is provided. The system comprises at least one radio transceiver configured for short range communication, a proximity component and a computer program application associated with the system, the radio transceiver being configured to communicate with the computer program application, and the proximity component being configured to be identified by the computer program application. The computer program application may upon identifying the proximity component be configured to initiate communication with the radio transceiver enabling exchange of data verifying one or more electronic objects. In accordance with another aspect of the present invention a method for initiating communication and enabling exchange of data between a system and an external device is provided. The system comprises at least one radio transceiver and a proximity component and a computer program application provided in the external device. The radio transceiver is configured to communicate with the computer program application, and the proximity component is configured to be identified by the external device. The method comprising positioning the external device in proximity to the proximity component, identifying, by the external device, the proximity component, and initiate communication, upon identification of the proximity component, between the external device and the radio transceiver. Exchange of data between the external device and the radio transceiver may for example enable exchange of data verifying one or more electronic objects associated with the user, enable exchange of data verifying one or more electronic objects associated with or the computer program application, and/or enable exchange of data verifying one or more electronic objects associated with the external device.

In accordance with an aspect, the system comprises at least one radio transceiver configured for short range communication and a proximity component. The at least one radio transceiver configured for short range communication may be configured to continuously broadcast an identification signal. The proximity component may be placed in proximity to the radio transceiver. The external device may be configured for identifying the proximity component. Upon identification of the proximity component, the at least one radio transceiver may be identified by the external device.

In accordance with a still further aspect of the invention, a method for initiating communication and enabling exchange of data between a system and a computer program application is provided. The system comprises at least one radio transceiver and a proximity component, the computer program application being associated with the system, the radio transceiver being configured to communicate with the computer program application, and the proximity component being configured to be identified by the computer program application. The method comprises receiving proximity information when an external device comprising at least a part of the computer program application is in proximity to the proximity component, and comprises initiate communication, upon receiving proximity information, between the computer program application and the radio transceiver. The method may further comprise the step of enabling exchange of data between the external device and the radio transceiver verifying one or more electronic objects associated with the user or the computer program application or the external device. Exchange of data between the external device and the radio transceiver may for example enable exchange of data verifying one or more electronic objects associated with the user, enable exchange of data verifying one or more electronic objects associated with or the computer program application, and/or enable exchange of data verifying one or more electronic objects associated with the external device.

According to another aspect of the present disclosure a computer program application is provided. The computer program application is configured to receive information on available radio transceivers configured for short range communication and signal strength of the available radio transceivers, for example of the broadcasted identification signals, and continuously evaluate the signal strength of the available radio transceivers to identify an available radio transceiver with maximum signal strength, to receive sensor information, and to determine based on the received sensor information whether a proximity component is in proximity. Upon determining that a proximity component is in proximity, selecting the available radio transceiver with maximum signal strength for initiating communication.

The computer program application may receive sensor information from a sensor device, such as from a sensor device positioned or co-located with the computer program application, or from a sensor device provided as a separate device. For example, at least a part of the computer program application may be installed on an external device, such as a handheld device, and the sensor may form part of the same handheld device, be attached to the handheld device, or be a device separate from the handheld device and preferably carried with the handheld device.

Typically, short range communication is implemented using short range communication protocols. Such communication protocols typically functions well when two or more devices are connected, however, the connection needs to be established before data may be exchanged. While such connection or set-up time may be acceptable for many usage scenarios, for example when a connection is intended to be maintained for a longer time, in other usage scenarios, for example when the connection is only intended to be maintained for a short while, such as when users pass by radio transceivers positioned in certain shops, carried by users, vehicles, etc., the acceptable connection or set-up time is much lower. It is an advantage of the present invention that the set-up or connection time between a radio transceiver and an external device may be reduced.

The computer program application may be installed, such as downloaded to, the external device, or the computer program application may be provided in a remote location, such as being provided as a cloud resource, available to the external device. Also, combinations may be foreseen in which parts of the computer program application are installed on the external device, while other parts are accessible from a remote location, such as a remote storage location, such as a cloud. In some embodiments, the computer program application may be associated with the system.

In some embodiments, when communication has been initiated, exchange of data may be enabled verifying one or more electronic objects. For example, exchange of data may enable exchange of data verifying one or more electronic objects associated with the user, enable exchange of data verifying one or more electronic objects associated with or the computer program application, and/or enable exchange of data verifying one or more electronic objects associated with the external device.

In some embodiments, the external device upon identifying the proximity component is configured to initiate exchange of data with an online service, using a broadcast identification signal from the radio transceiver having the highest broadcast signal strength. Thus when the external device identifies the proximity component, exchange of data with an online service is initiated, using the identification signal from the radio transceiver with the highest signal strength. The online service may be provided by an online service provider, which can, for example, be an Internet service provider, an email provider, a news provider (press), an entertainment provider (music, movies), a search engine, an e-commerce site, an online banking site, a health site, an official government site, a wiki, or an Usenet newsgroup etc.

The electronic object may include one or more of the following: a transit ticket, an event ticket, a voucher, a coupon, a token, a monetary value, a monetary value in cryptographic currency, such as a bitcoin, a personal identification of the user, including a passport, a personal, financial and/or medical identification of the user and/or of the computer program application and/or of the external device and/or of another computer program application associated with the external device.

The proximity component and/or the radio transceiver may be provided in one or more devices, they may be provided as separate elements, such as in stand-alone devices. The proximity component and/or the radio transceiver may be provided or embedded in other devices, such as in one or more of the following: a card payment terminal, a turnstile, a vending machine, a card reader, a fare collection terminal, a keypad, an access control system, an automated gate, a handheld personal communication device such as a mobile phone or personal digital assistant or a tablet computer, etc.

In scenarios where many people passes specific transceivers, it is an advantage that the connection or set-up time between transceivers as carried by the people and the specific transceivers is as short as possible. Thus, it is an advantage of the present invention that communication is initiated as soon as the proximity component is detected.

In some embodiments, the initiation of communication includes the selection of a specific transceiver.

Thus, the proximity component may be identified by the external device when a signal and/or field strength caused by the proximity component as measured by a proximity sensor in the external device reaches a signal and/or field strength detection threshold.

In some embodiments, the proximity component is identified by the external device, when a signal and/or field strength caused by the proximity component reaches a signal and/or field strength detection threshold. Typically, the signal and/or field strength caused by the proximity component is measured or detected by a proximity sensor, such as a proximity sensor provided in the external device. However, it is envisaged that the proximity sensor also may be provided in a separate sensor device, or as a sensor device attachable to the external device.

The measurements from the proximity sensor may be evaluated by the proximity sensor, such as by a processor in the proximity sensor, or the measurement results may be provided to the computer program application for evaluation in the computer program application.

The signal and/or field strength detection threshold may be one or more absolute threshold values. Alternatively or additionally, the signal and/or field strength detection threshold may be determined as a relative change in signal and/or field strength obtained within a predefined time interval.

The signal and/or field strength detection threshold and/or the predefined time interval may be configured in the computer program application according to external device specificities and/or according to proximity sensor specificities. Hereby, the computer program application may compensate for different types or models of proximity sensors, different positioning of proximity sensors within different external devices, etc.

Thus, the computer program application may be configured to receive proximity sensor information indicating either measurements obtained by the proximity sensor, or indications as to whether the signal and/or field strength reaches one or more signal and/or field strength detection thresholds.

The proximity component may be a passive proximity component, such as a passive proximity component having self-contained physical properties, such as a static proximity component.

A passive proximity component is a component which does not rely on a power source for functioning, and passive proximity components may include two-terminal components such as resistors, capacitors, inductors, and transformers. Passive proximity components may furthermore include passive proximity components having self-contained or inherent physical properties, such as proximity components comprising magnets, such as comprising permanent magnets.

The proximity component may comprise one or more magnetic elements having magnetic properties, such as permanent magnetic properties. For example, the proximity component may have a magnetic surface, such as a permanent magnetic surface.

It is an advantage to use a magnetic element as the proximity component, since the magnetic field strength and/or direction may change heavily when a magnetometer is moved close to the magnetic element, depending on the magnetic element used. For example, when the magnetometer is moved a small distance of 10 cm, the magnetometer reading may change significantly. As opposed to this, the strength of radio signals may only change little if the one of the transceivers are moved a small distance, such as 10 cm. Thus measurements of a magnetic field strength may be preferred over measurements of the strength of radio signals, when detecting proximity between devices.

In some embodiments, a field caused by the one or more magnetic elements including the strength and/or direction of the magnetic field may be measured by a proximity sensor, such as a proximity sensor provided in the external device. Thus, the field caused by the one or more magnetic elements including the strength and/or direction of the magnetic field may be measured by the external device.

The proximity sensor may be any sensor capable of establishing proximity to the proximity component. The proximity sensor may be a magnetometer, such as a Hall Effect sensor, such as a magneto resistive device, etc.

It is envisaged that also other proximity components and proximity sensors than those mentioned specifically above may be used, for example by using capacitive sensing, absorption of emitted radiation, such as Infrared light absorption, etc.

The external device may be a handheld personal communication device, such as a mobile phone, a smart phone, a tablet, a smart watch, a smart accessory, such as any personal communication device capable of comprising a proximity sensor and the computer program application. The external device typically also comprises an external device radio transceiver, for connecting with the radio transceiver of the system.

In some embodiments the system comprises a handheld personal communication device, where the radio transceiver is provided in the handheld personal communication device, and where the proximity component is provided in the handheld personal communication device or adjacent to the handheld personal communication device, and wherein a payee computer program application is provided in the handheld personal communication device for receiving exchange of payment data verifying one or more electronic objects associated with the user or the computer program application or the external device.

In some embodiments the proximity component provided in the handheld personal communication device is a magnet or magnetic material present in a loudspeaker in the handheld personal communication device.

In some embodiments the proximity component provided adjacent to the handheld personal communication device is a magnet or magnetic material present adjacent to the handheld personal communication device, such as present in an attachable cover, in an adhesive label, and/or in an attachable accessory device.

Thus the system may comprise a handheld personal communication device such as a mobile phone or personal digital assistant or tablet computer functioning as a payment terminal by having a dedicated payee computer program application installed or associated with the handheld personal communication device. Such handheld personal communication device may be associated with a person, a private person, a business, a business owner, a taxi, a taxi driver and/or with a shop or the like, where the private person and/or the shop will receive payment from the external device. The external device may be associated with a private person. The external device may be a handheld personal communication device, such as a smart phone. Thus a payment may be performed between two handheld personal communication devices, such as between two smart phones, each smart phone being associated with a private person or shop or the like.

A computer program application is provided in the external device, thus this computer program application may be a payer app for sending the payment in the system, the system may comprise a handheld personal communication device.

A payee computer program application may be provided in a handheld personal communication device, thus this payee computer program application may be a payee app for receiving the payment from the external device.

The proximity component may be provided in, such as internally in, a handheld personal communication device and/or the proximity component may be provided adjacent to, such as externally to or co-located relative to, a handheld personal communication device. The proximity component may be provided as an attachment to the handheld personal communication device. The proximity component may be provided in a cover or as a cover to the handheld personal communication device, such as an extra cover, such as a protective cover for protecting the handheld personal communication device against impacts. The proximity component may be provided as an adhesive label to the handheld personal communication device, such as an adhesive label adhered to the handheld personal communication device. The proximity component may be provided as an accessory, an add-on, a gadget to the handheld personal communication device, such as wired, such as attached as a plug to the handheld personal communication device through a socket in the handheld personal communication device, such as through a charger socket, such as through a USB (Universal Serial Bus) socket, such as through a micro-USB or USB C socket, such as through a jack socket etc. The proximity component may be provided as an accessory, an add-on, a gadget to the handheld personal communication device, such as wireless, such as an accessory, an add-on, a gadget placed in proximity to the handheld personal communication device for wireless connection.

The proximity component may comprise magnets, such as comprising permanent magnets. The proximity component may comprise one or more magnetic elements having magnetic properties, such as permanent magnetic properties. For example, the proximity component may have a magnetic surface, such as a permanent magnetic surface.

The proximity component may be provided in the handheld personal communication device as magnetic material attached to handheld personal communication device, such as a magnetic sticker or magnetic material attached to or embedded in a mobile phone cover.

The magnetic proximity component provided in a handheld personal communication device may be magnets or magnetic material present in one or more loudspeakers, speakers or acoustic output transducers, which loudspeakers, speakers or acoustic output transducers are embedded, incorporated or comprised in the handheld personal communication device for the purpose of transmitting sound to the user of the handheld personal communication device, e.g. during a phone call, when listening to media content such as music etc.

Thus it is an advantage that no dedicated proximity component has to be incorporated in a handheld personal communication device for it to work as a payment terminal, the magnets or magnetic material already present in the integrated loudspeakers, speakers or acoustic output transducers in the handheld personal communication device may be used as proximity components. Thus the proximity component in the handheld personal communication device, such as a smart phone, may be inherent or integrated in a standard handheld personal communication device, and thus a standard handheld personal communication device can be used, there is no need for a custom handheld personal communication device.

In some embodiments, a plurality of radio transceivers is available, and additionally or alternatively, the system may comprise a plurality of radio transceivers and a corresponding plurality of proximity components. The computer program application may select a specific radio transceiver based on a broadcast signal strength evaluation of the plurality of radio transceivers or based on a user input to the computer program application selecting the specific radio transceiver. The external device and/or the computer program application may be configured to initiate communication with the at least one radio transceiver having a broadcast signal strength higher than other available broadcast signals.

The system for initiating communication may comprise a plurality of radio transceivers, and at least some of the plurality of radio transceivers may be distributed within range of at least one of the radio transceivers. Thus, within range of a specific radio transceiver, other radio transceivers may be present. This may be the case in scenarios in which more radio transceivers are positioned in a same room or a same area, the room or the area being of a size in the same order as the range of the radio transceivers, or the room or the area being of a size corresponding to two or three times the range of the radio transceivers.

Such a scenario may include, but is in no way limited to, payment terminals in shops, such as shops having more than one payment terminal, such as super stores, super markets, grocery stores, department stores, hardware stores, etc., payment terminals in theatres, cinemas, public transportation, etc., authorization check points, such as entrances, passage ways, etc., public transportation entrances, theatres or cinema entrances, etc., in which for example a radio transceiver is associated with each payment terminal, authorization check point, etc.

In some embodiments, the at least one radio transceiver is configured to broadcast a radio transceiver identification signal. The computer program application may upon reception of the radio transceiver identification signal be configured to confirm whether the radio transceiver identification signal corresponds to a pre-approved radio transceiver.

The computer program application typically receives a radio transceiver identification signal from each available radio transceiver, however, not all of these radio transceivers may form part of the system for initiating communication. Thus, the computer application program may be configured to confirm whether the radio transceiver identification signal corresponds to a pre-approved radio transceiver. A list and/or a common pattern of pre-approved radio transceivers may thus be provided in the computer program application, such as provided in a storage of the computer program application. Alternatively, or additionally, the list of pre-approved radio transceivers may be accessible from the computer program application, such as by being stored in a remote location, such as in a remote storage location, such as in a in a cloud based storage. By storing the list of pre-approved radio transceivers in a remote location, such as in a cloud based storage, it may be ensured that the list is updated continuously. In some embodiments, the connection between the computer program application and the remote location is provided via a secure connection, such as via an encrypted connection. Hereby, the risk of fraudulent addition of false pre-approved radio transceivers may be reduced.

The signal strength may be evaluated for available and pre-approved radio transceivers and a pre-approved radio transceiver with maximum signal strength may be selected for initiating communication. In some embodiments, the signal strength may be evaluated for all available radio transceivers, and approval may be checked only after selecting a radio transceiver with maximum signal strength.

In some embodiments, the available radio transceiver with maximum signal strength is selected immediately upon receiving proximity information. It is an advantage of selecting the available radio transceiver with maximum signal strength upon receiving proximity information, such as immediately upon receiving proximity information, that a standard evaluation time for a transceiver before establishing connection or pairing may be overruled.

The radio transceiver may upon communication with the computer program application, provide a control signal to enable a further action, the further action including providing access, granting authorization, initiating and/or authorizing payment, and/or approving user identity, etc.

The further action may be enabled via a wired or wireless enabling communication signal provided to a further device.

The radio transceiver in the system for initiating communication may be configured to communicate via a short range communication protocol including Bluetooth, Bluetooth Low Energy, ZigBee, ANT or Wi-Fi, WLAN, etc. The external device radio transceiver in the external device may be a radio transceiver configured for communication using a corresponding communication protocol. Typically, short range communication indicates a range of less than 100 meters, such as less than 30 meters, such as less than 10 meters, a range between 1 and 100 meters, such as between 1 and 30 meters, such as between 1 and 10 meters, a range of between 5 and 30 meters, such as between 5 and 10 meters, etc. Typically, cellular protocols are long range protocols having a range of several kilometres, such as above 1000 m, such as above 5000 m.

Furthermore, a computer program may be provided, the computer program comprising program code means for performing the steps of any of the methods as herein disclosed, when said computer program is run on a computer.

Still further, a computer readable medium having stored thereon program code means for performing any of the methods as herein disclosed when said program code means is run on a computer.

The present invention relates to different aspects including the system described above and in the following, and corresponding methods, devices, systems, computer program applications, kits, uses and/or product means, each yielding one or more of the benefits and advantages described in connection with the first mentioned aspect, and each having one or more embodiments corresponding to the embodiments described in connection with the first mentioned aspect and/or disclosed in the appended claims.

BRIEF DESCRIPTION OF THE DRAWINGS

The above and other features and advantages will become readily apparent to those skilled in the art by the following detailed description of exemplary embodiments thereof with reference to the attached drawings, in which:

FIG. 7 shows a flow chart of another method according to the present disclosure for initiating communication between a system and an external device.

DETAILED DESCRIPTION

Figure 1A:
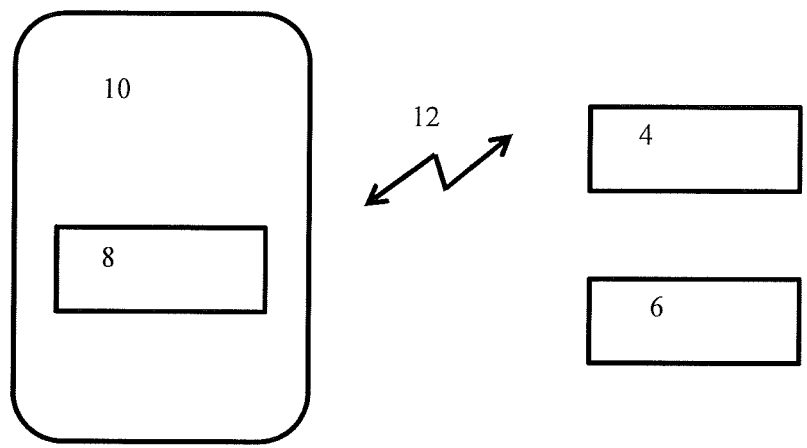
FIG. 1 schematically illustrates various implementation of the system as shown in FIGS. 1a), 1b), 1c), and 1d).

Various embodiments are described hereinafter with reference to the figures. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

Throughout, the same reference numerals are used for identical or corresponding parts.

FIG. 1a) schematically illustrates a system 2 comprising at least one radio transceiver 4 configured for short range communication 12, a proximity component 6 and a computer program application 8 provided in an external device 10. The radio transceiver 4 is configured to communicate with the computer program application 8. The proximity component 6 is configured to be identified by the external device 10 and/or the computer program application 8. The external device 10 is configured to, upon identifying the proximity component 6, initiate communication with the radio transceiver 4 to enable exchange of data verifying one or more electronic objects associated with the user or the computer program application 8 or the external device 10.

Figure 1B:
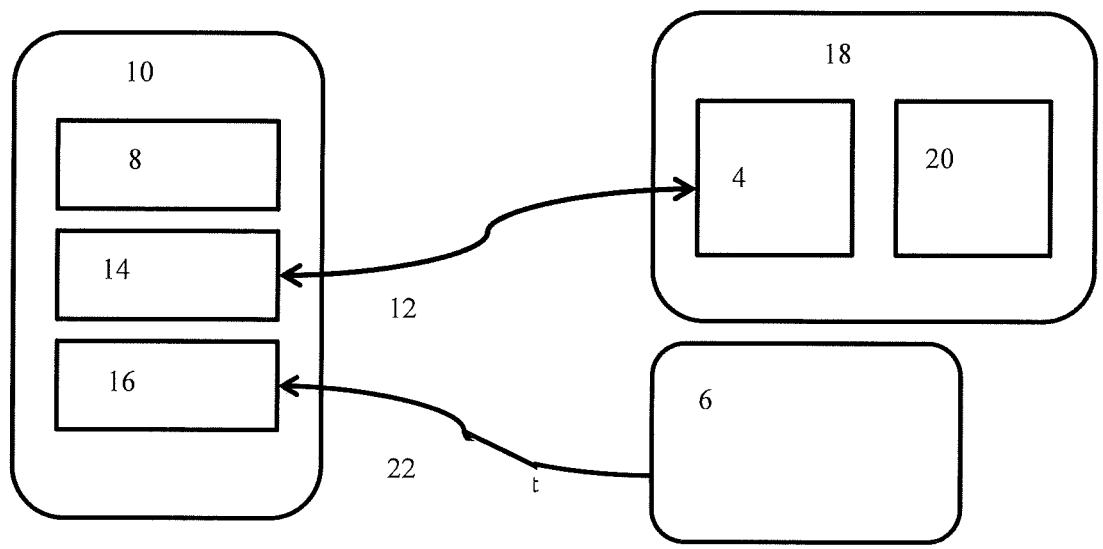

FIG. 1b) schematically illustrates a system 25 comprising at least one radio transceiver 4 configured for short range communication 12, a proximity component 6 and a computer program application 8 provided in an external device 10. The radio transceiver 4 is configured to communicate with the computer program application 8. The proximity component 6 is configured to be identified by the external device 10. The external device 10 is configured to, upon identifying the proximity component 6, initiate communication with the radio transceiver 4 to enable exchange of data verifying one or more electronic objects associated with the user or the computer program application 8 or the external device 10.

The external device 10 further comprises an external device radio transceiver 14 configured for communication with the radio transceiver 4.

The external device further comprises a proximity sensor 16 configured for measuring 22 a signal and/or field strength caused by the proximity component 6.

The radio transceiver 4 is configured in a device 18, such as a payment terminal. The device 18 further comprises a component 20 configured for wired or wireless communication.

External devices 10, such as smartphones, can be used to device to device communications. A use case is the ability to tap a certain point, e.g. a device 18, such as a payment terminal, to initiate communication with another device. The present disclosure uses a combination of radio communication, e.g. Bluetooth communication, and proximity sensing, such as magnetic fields, to initiate communication and enabling data communication between devices.

The external device 10 may be equipped with a proximity sensor 16, such as a magnetic sensor, an external device radio transceiver 14, such as for providing Bluetooth communication, and a computer program application 8, such as a software application or app, for a smart phone. Generally, the computer application program may be any application program, such as an app, and may be executable on an external device, such as an external device comprising a processor. The computer program application may furthermore be configured to exchange data related to payments, personal identification, transit tickets, event tickets, vouchers, coupons etc., or the computer program application may be associated with another computer program application configured to exchange data related to payments, personal identification, transit tickets, event tickets, vouchers, coupons etc.

The data exchange is configured to be performed with another device 18 which is equipped with a radio transceiver 4, e.g. for Bluetooth communication.

The data may only be exchanged when the user brings the external device 10 within a short distance, such as 10 cm, from e.g. a label, such as a sticker or a payment terminal, of the device 18. As radio signals may not be reliable to determine when the external device is brought within the short range of the label, a proximity sensor, such as a magnet, is placed together with the label.

The computer program application continuously measures the signal strengths of nearby radio transceivers.

The computer program application on the external device measures for example the strength of the magnetic field and stores these data. If for example the measured strength of the magnetic field increases beyond a certain threshold (A) over a timespan of (t) OR if the magnetic field reaches a certain absolute threshold (T) the computer program application initiates communication with device 18.

In a context with multiple devices like device 18, the computer program application will select the device 18 with for example the highest measured signal strength.

Figure 1C:
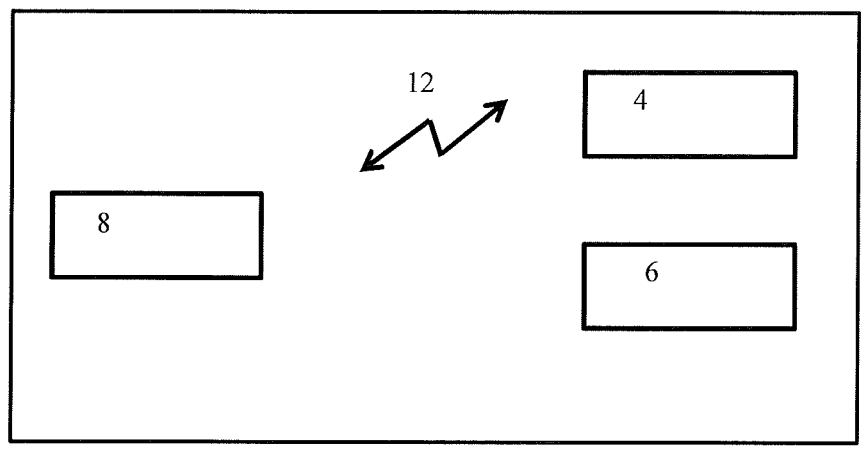

In FIG. 1c) another exemplary system 30 for initiating communication is shown schematically, the system 30 comprising at least one radio transceiver 4 configured for short range communication 12, a proximity component 6 and a computer program application 8 associated with the system, the radio transceiver 4 being configured to communicate with the computer program application 8, and the proximity component 6 being configured to be identified by the computer program application 8. The computer program application 8 upon identifying the proximity component 6 is configured to initiate communication 12 with the radio transceiver 4 enabling exchange of data verifying one or more electronic objects.

Figure 1D:
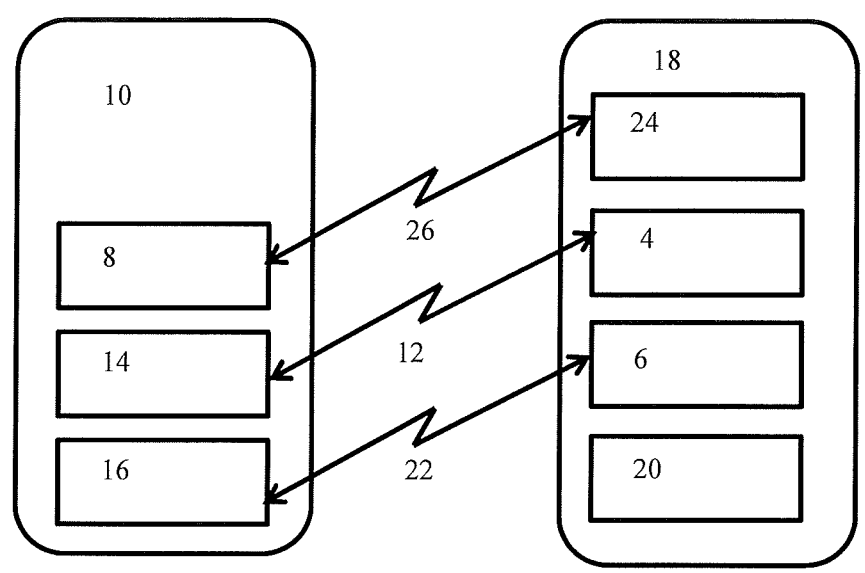

FIG. 1d) schematically illustrates a system 31 comprising at least one radio transceiver 4 configured for short range communication 12, a proximity component 6 and a computer program application 8 provided in an external device 10, such as a smart phone. The radio transceiver 4 is configured to communicate with the computer program application 8. The proximity component 6 is configured to be identified by the external device 10. The external device 10 is configured to, upon identifying the proximity component 6, initiate communication with the radio transceiver 4 to enable exchange of data verifying one or more electronic objects associated with the user or the computer program application 8 or the external device 10.

The external device 10 may further comprises an external device radio transceiver 14 configured for communication with the radio transceiver 4.

The external device 10 further comprises a proximity sensor 16 configured for measuring 22 a signal and/or field strength caused by the proximity component 6.

The radio transceiver 4 is configured in a handheld personal communication device 18, such as a smart phone. The handheld personal communication device 18 further comprises a component 20 configured for wired or wireless communication.

External devices 10, such as smartphones, can be used to device to device communications. A use case is the ability to tap a certain point, e.g. a handheld personal communication device 18, such as a smart phone, to initiate communication with this device 18. The present disclosure uses a combination of radio communication, e.g. Bluetooth communication, and proximity sensing, such as magnetic fields, to initiate communication and enabling data communication between the external device 10 and the handheld personal communication device 18.

The external device 10 may be equipped with a proximity sensor 16, such as a magnetic sensor, an external device radio transceiver 14, such as for providing Bluetooth communication, and a computer program application 8, such as a software application or app, for a smart phone. Generally, the computer application program 8 may be any application program, such as an app, and may be executable on an external device, such as an external device comprising a processor. The computer program application 8 may furthermore be configured to exchange data related to payments, personal identification, transit tickets, event tickets, vouchers, coupons etc., or the computer program application may be associated with another computer program application configured to exchange data related to payments, personal identification, transit tickets, event tickets, vouchers, coupons etc.

The handheld personal communication device 18 may be equipped with a proximity component 6, such as a magnet or magnetic material, a radio transceiver 4, such as for providing Bluetooth communication, and a payee computer program application 24, such as a software application or app, for a handheld personal communication device, such as a smart phone, for communicating 26 with and receiving payment, or data related to payment, from the computer program application 8 provided in the external device 10. Generally, the payee computer application program 24 may be any application program, such as an app, and may be executable on a handheld personal communication device, such as a handheld personal communication device comprising a processor. The payee computer program application 24 may be configured to receive and/or exchange data related to payments, personal identification, transit tickets, event tickets, vouchers, coupons etc., or the payee computer program application 24 may be associated with another computer program application configured to receive and/or exchange data related to payments, personal identification, transit tickets, event tickets, vouchers, coupons etc.

The proximity component 6 provided in a handheld personal communication device 18 may be magnets or magnetic material present in one or more loudspeakers, speakers or acoustic output transducers embedded, incorporated or comprised in the handheld personal communication device 18 for the purpose of transmitting sound to the user of the handheld personal communication device 18, e.g. during a phone call, when listening to media content such as music etc.

Alternatively and/or additionally the proximity component may be provided as an attachment to the handheld personal communication device, such as provided in a cover to the handheld personal communication device, such as provided as an adhesive label to the handheld personal communication device, such as provided as an accessory, an add-on, a gadget to the handheld personal communication device, such as wired or wireless.

The data exchange is configured to be performed with the handheld personal communication device 18 which is equipped with a radio transceiver 4, e.g. for Bluetooth communication.

The data may only be exchanged when the user of the external device 10 brings the external device 10 within a short distance, such as 10 cm, from the handheld personal communication device 18. As radio signals may not be reliable to determine when the external device 10 is brought within the short range of the handheld personal communication device 18, a proximity sensor, such as a magnetometer, may be used in the external device 10, and a proximity component 6, such as a magnet or magnetic material, may be used in the handheld personal communication device 18.

The computer program application 8 provided in the external device 10 continuously measures the signal strengths of nearby radio transceivers, such as the radio transceiver 4 provided in the handheld personal communication device 18.

The computer program application 8 on the external device 10 measures for example the strength of the magnetic field and stores these data. If for example the measured strength of the magnetic field increases beyond a certain threshold (A) over a timespan of (t) OR if the magnetic field reaches a certain absolute threshold (T) the computer program application initiates communication with the handheld personal communication device 18.

In a context with multiple devices like the handheld personal communication device 18, the computer program application 8 in the external device 10 will select the device 18 with for example the highest measured signal strength.

Figure 2:
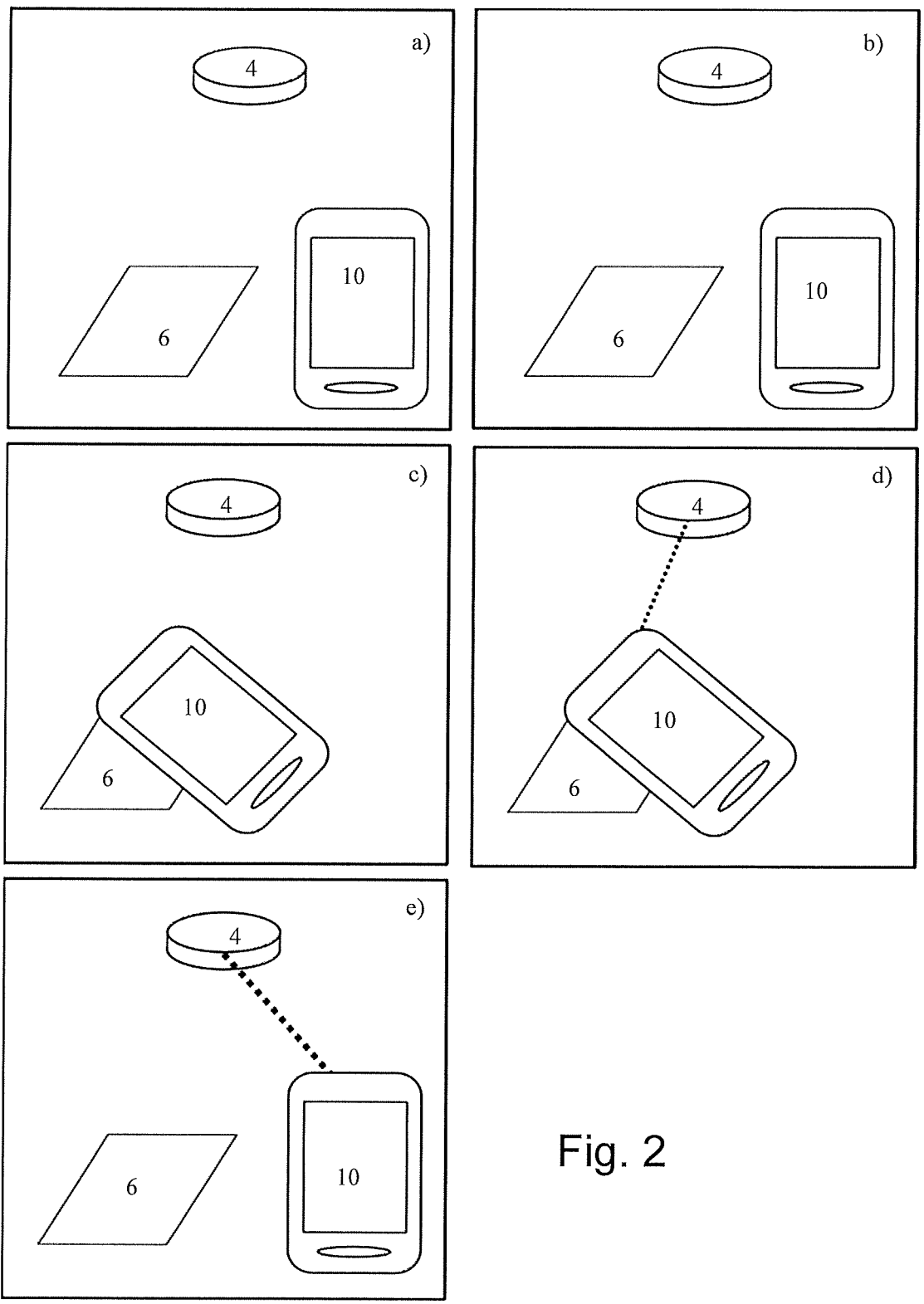
FIG. 2 schematically illustrates an example of the system with one radio transceiver, FIG. 3 schematically illustrates an example of the system with more radio transceivers.

FIG. 2 schematically illustrates an example of the system 2, 25, 30, 31 with one radio transceiver 4.

In FIG. 2a) the radio transceiver 4 and a proximity component 6, such as a proximity component comprising one or more magnetic elements, are placed close together. No other radio transceivers 4 are between the proximity component 6 and the transceiver 4. The transceiver 4 is broadcasting a unique identification signal.

In FIG. 2b) the external device 10, e.g. a smartphone, tablet or PDA, starts a computer program application 8 that measures the magnetic field strength and/or direction, and calculates e.g. the absolute strength of the field, from the magnetic device 6. The computer program application may also continuously measure the signal strength of broadcasted radio signals send by nearby transceivers. The magnetic strength is measured and stored in the device memory of the external device.

In FIG. 2c) the external device 10 is introduced into the magnetic field surrounding the magnetic device 6. Logic on the computer program application running on the external device concludes that external device is in proximity to the proximity component, i.e. the magnetic device.

In FIG. 2d) the external device initiates communication with the transceiver, if the computer program application determines that the identification broadcasted from the device associated with the transceiver 4 is acceptable or approved.

In FIG. 2e), the external device may be removed from the magnetic device, but may still remain connected to communicate with the radio transceiver.

As is evident from the above, even though not explicitly shown in the drawing, the external device may in this and any other embodiment comprise a device storage and a processor. Likewise, when reference is made to a radio transceiver, inherently also an antenna for such transceiver, as well as a circuit or a processor for controlling the transceiver is disclosed. Thus, when an external device is configured to connect to a radio transceiver of the system, inherently, the antenna of the radio transceiver in the external device is configured to connect to an antenna of the radio transceiver in the system, to thereby establish a connection between the two transceivers.

The radio transceiver 4 may be present in a payment terminal, such as a dedicated payment terminal located in a fixed or substantially fixed position in a business, shop, building, vehicle or the like.

Figure 3:
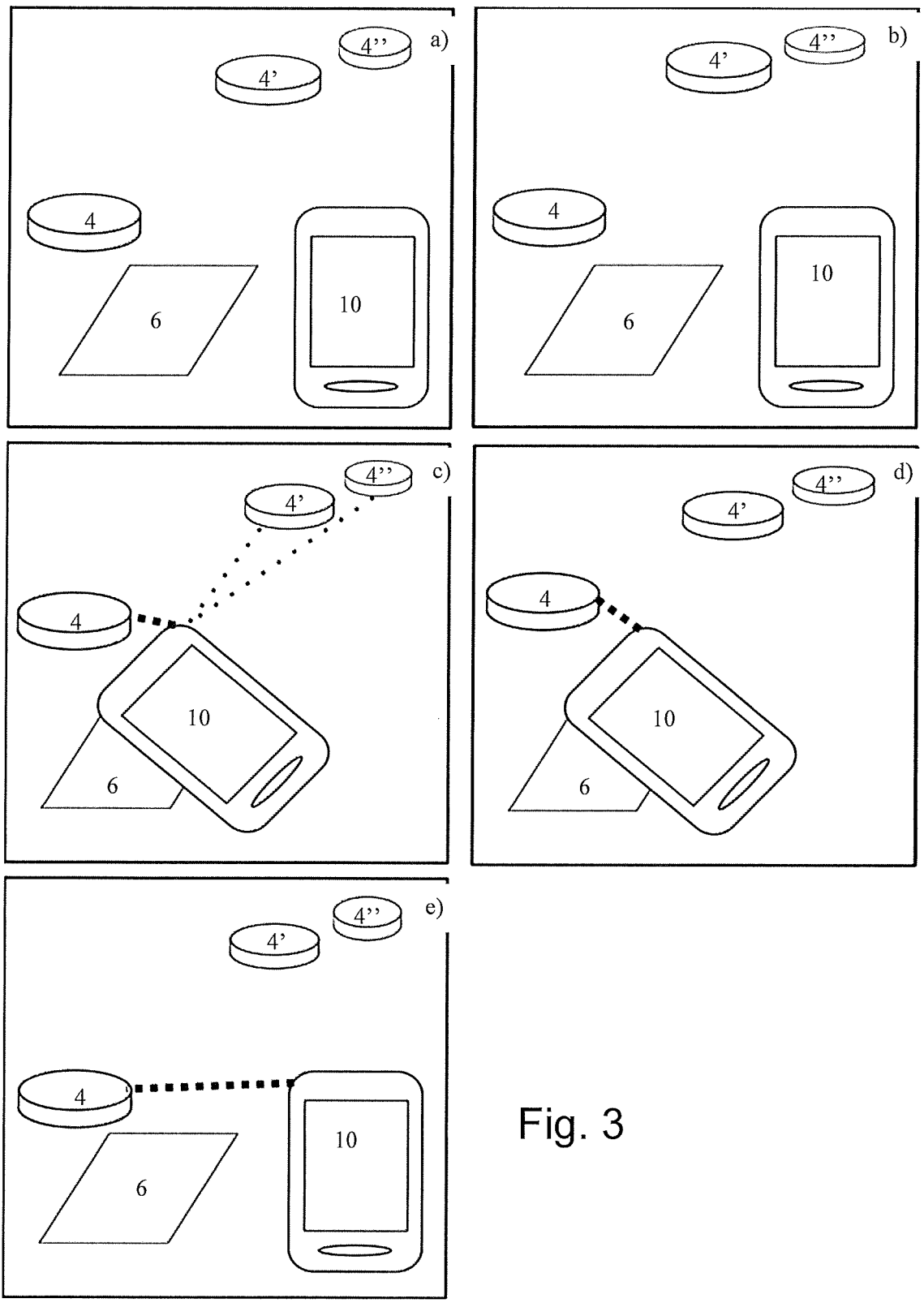

FIG. 3 schematically illustrates an example of the system 2, 25, 30, 31 with more radio transceivers 4. The system comprises a plurality of radio transceivers and a corresponding plurality of proximity components. The computer program application is then configured to select a specific radio transceiver based on a broadcast signal strength evaluation or based on a user input to the computer program application selecting the specific radio transceiver. At least some of the plurality of radio transceivers is distributed within range of at least one of the radio transceivers. The external device is configured to initiate communication with the at least one radio transceiver having a broadcast signal higher than other available broadcast signals.

In FIG. 3a) a radio transceiver 4 and a proximity component 6, such as a magnetic device, are placed or positioned close together. Multiple other transceivers 4', 4" and proximity components 6', 6" are placed nearby. The transceiver 4 is broadcasting a unique identification signal.

In FIG. 3b) the external device 10, e.g. a smartphone, tablet or PDA, starts a computer program application 8 that e.g. measures the magnetic field strength and/or direction, and calculates the absolute strength of the field from the magnetic device 6. The computer program application also continuously measures the signal strength of broadcasted radio signals send by nearby transceivers 4', 4". The magnetic field strength is measured and stored in the devices memory of the external device.

It should be envisaged that the external device 10 may start the computer program application in response to a user input, or the external device 10 may be prompted to start the computer program application upon launch of another computer program application.

In FIG. 3c) the external device is introduced into the magnetic field surrounding the magnetic device 6. Logic on the computer program application running on the external device concludes that the external device is in proximity to the proximity component, i.e. the magnetic device.

In FIG. 3d) the external device initiates communication with the transceiver 4 broadcasting with the highest signal strength and with acceptable broadcasted identification, if the computer program application determines that the identification broadcasted from the transceiver 4 is acceptable or approved.

In FIG. 3e) the external device may be removed from the magnetic device, but may still remain connected to communicate with the connected radio transceiver 4.

In some events, the computer program application as disclosed herein may be embedded in another computer program application.

The radio transceivers 4, 4', 4'' may be present in payment terminals, such as dedicated payment terminals located in a fixed or substantially fixed position in a business, shop, building, vehicle or the like.

Figures 4, 5:
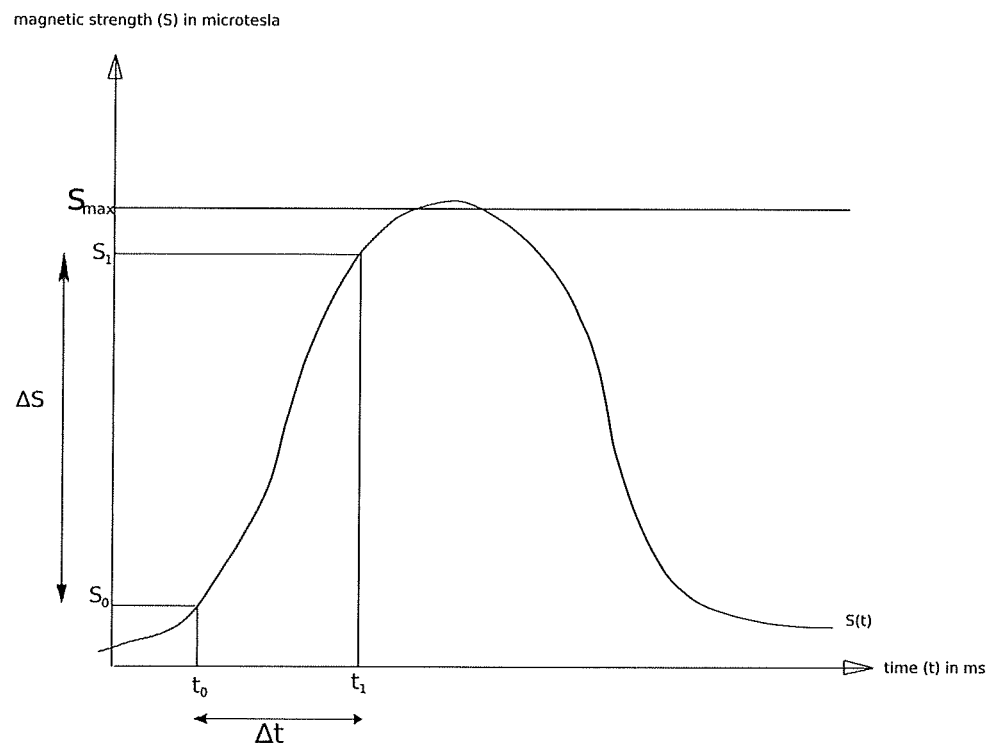
FIG. 4 shows a graph illustrating the magnetic field strength S measured over time as a proximity sensor is introduced and removed from a proximity component.
FIG. 5 shows an example of measured values of the magnetic field strength in a time interval.

FIG. 4 shows a graph illustrating the magnetic field strength S measured over time as a proximity sensor, such as a magnetometer, in an external device, is introduced and removed from a proximity component, such as magnet or magnetic device.

The external device measures a field caused by the one or more magnetic elements including the strength and/or direction of the magnetic field. The signal and/or field strength detection threshold may be an absolute threshold value or the signal and/or field strength detection threshold may be determined as a relative change in signal and/or field strength obtained within a predefined time interval. The signal and/or field strength detection threshold and/or the predefined time interval may be configured in the computer program application according to external device specificities.

The graph shows the magnetic field strength (S) on the y-axis. Most magnetometers produce measurements as three dimensional vectors. As the direction of the magnetic field may be irrelevant for detecting proximity, S is calculated from the length of the magnetic field vector by $\sqrt{(x^2+y^2+z^2)}$. $\Delta S$ is the increment in magnetic field strength that determines if the device is being introduced into a magnetic field. The magnetic field strength is measured in microtesla.

The graph shows time (t) on the x-axis. Time is measured in milliseconds. $\Delta t$ is the timespan in milliseconds for the application to compare values.

The field strength detection threshold values may be static parameters, which can be general to the computer program application running on the external device. Alternatively and/or additionally they can be adapted to the external device model, to compensate for differences in magnetometer sensitivity and magnetic properties of the external device model.

FIG. 5 shows an example of measured values of the magnetic field strength in a time interval. When the computer program application on the external device is started, measurements from the magnetometer or magnetic sensor in the external device may be stored in the device memory as datasets containing a timestamp and the corresponding measured magnetic field strength. From the data in FIG. 5 it is seen that within few milliseconds the magnetic field strength changes significantly, when the magnetometer is moved close to the magnetic element. The distance between the magnetometer and magnetic element may change 10 cm within the entire time interval.

A pairing logic in the computer program application determines whether the proximity component is in proximity and thus whether communication should be initiated with the radio transceiver associated with the magnetic component, such as magnetic device or magnet.

For each new dataset stored in the device memory, a set of logic rules are applied to decide if the external device should initiate communication with the radio transceiver.

Rule #1 determines if the absolute strength of the magnetic field is above a certain value $S_{max}$. If this is satisfied, then communication is initiated, i.e. initiate communication if: $S(t) >= S_{max}$ As the absolute measurements of a magnetic field can be influenced by the external device and its surroundings e.g. a protective cover for the external device, e.g. a protective cover for a smartphone, a second rule is used to detect relative changes in a magnetic field:

Rule #2 determines if the change in S over time $\Delta t$ is greater than $\Delta S$. If this is satisfied, then communication is initiated, i.e. initiate communication if: $S(t_1)-S(t_0)>=\Delta S$.

Also any combination of Rule #1 and Rule #2 may be provided.

The computer program application may alternatively and/or additionally prompt the user to actively select or approve the device to initiate communication with upon detection of the highest magnetic field strength.

Figure 6:
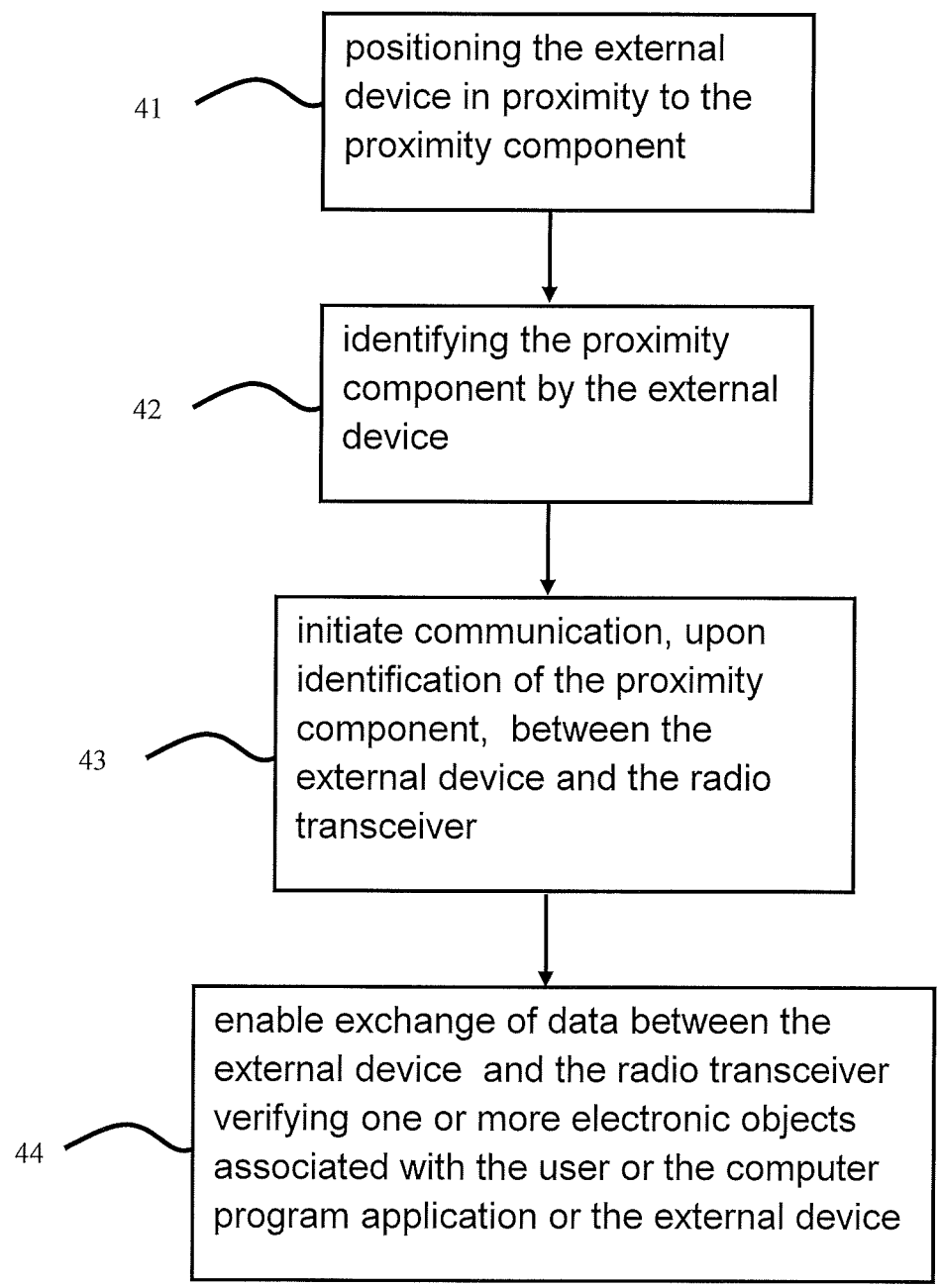
FIG. 6 shows a flow chart of one method according to the present disclosure for initiating communication between a system and an external device.

FIG. 6 shows a flow chart of one method 40 according to the present disclosure for initiating communication between a system 2, 25, 30, 31 and an external device 10 according to one aspect of the present invention. The method comprises the step 41 of positioning the external device in proximity to the proximity component 6, identifying, by the external device 10, the proximity component 6, in step 42, initiate communication, upon identification of the proximity component, between the external device and the radio transceiver in step 43, to enable exchange of data between the external device and the radio transceiver verifying one or more electronic objects associated with the user or the computer program application or the external device, in step 44.

FIG. 7 shows a flow chart of another method 50 according to the present disclosure for initiating communication between a system 2, 25, 30, 31 and a computer program application 8, the method comprising in step 51, receiving proximity information when an external device comprising at least a part of the computer program application is in proximity to the proximity component, and in step 52 initiate communication, upon receiving proximity information, between the computer program application and the radio transceiver. In step 53, exchange of data between the external device and the radio transceiver is enabled for verifying one or more electronic objects associated with the user or the computer program application or the external device.

Figure 8:
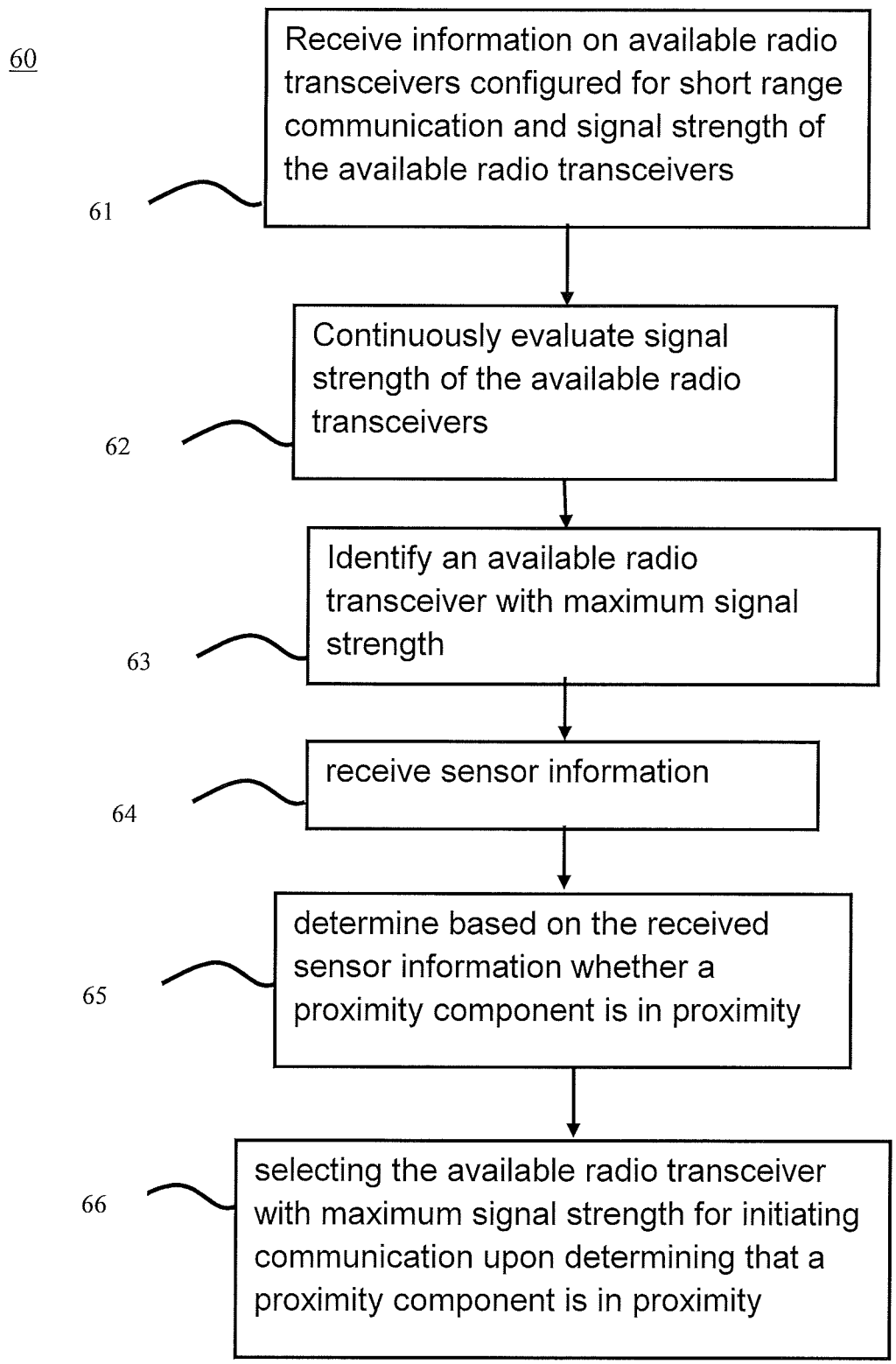
FIG. 8 shows a method implemented in a computer program application according to the present disclosure.

FIG. 8 shows a flow chart of a method 60 according to the present disclosure implemented in a computer program application, the method for initiating communication with system 2, 25, 30, 31. In step 61, information on available radio transceivers configured for short range communication and signal strength of the available radio transceivers is received. The signal strength of the available radio transceivers is continuously evaluated in step 62, and in step 63 an available radio transceiver with maximum signal strength is identified. Sensor information is received in step 64, and in step 65 it is determine based on the received sensor information whether a proximity component is in proximity. Upon determining that a proximity component is in proximity, the available radio transceiver with maximum signal strength is selected in step 66 for initiating communication.

Figure 9:
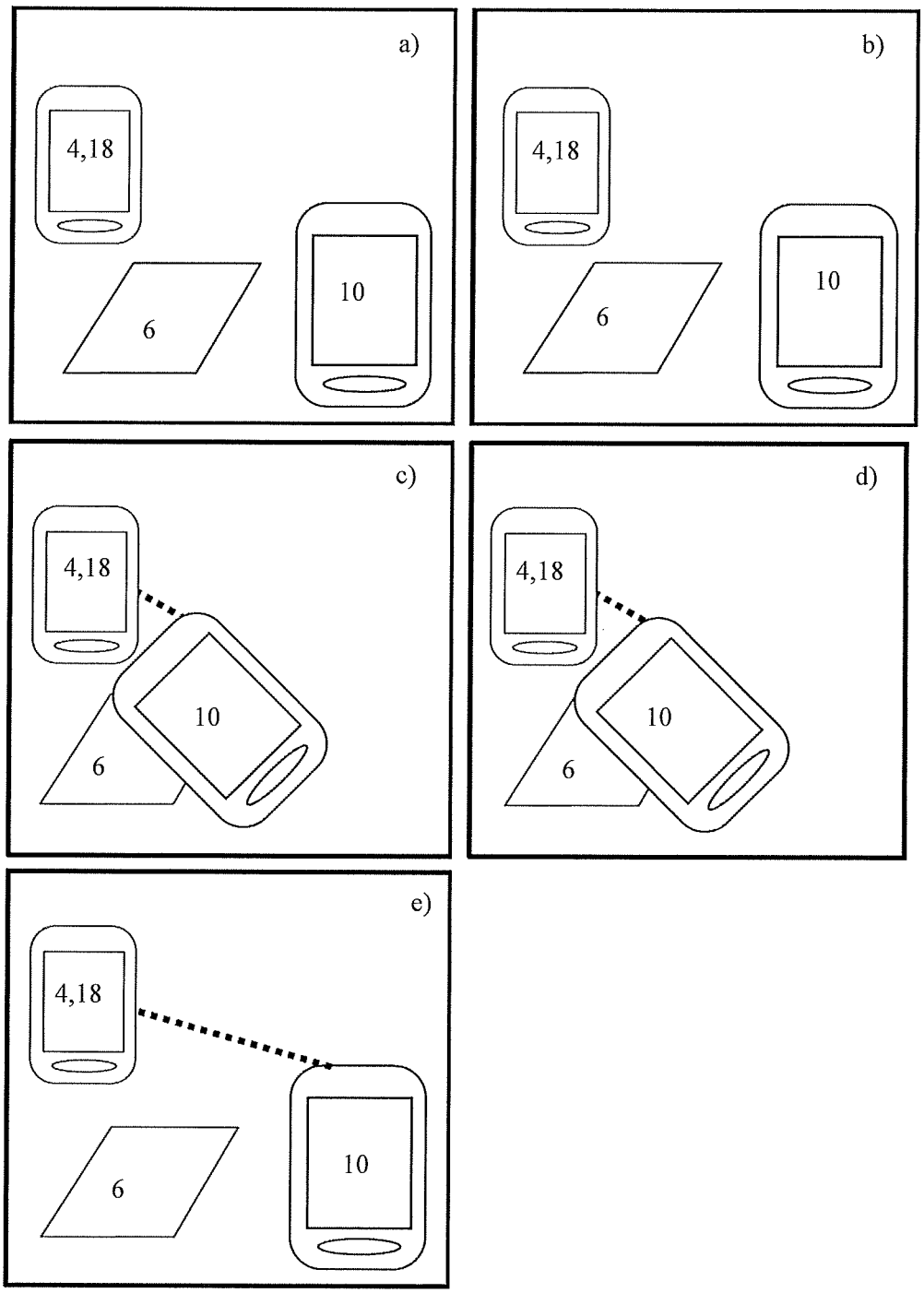
FIG. 9 schematically illustrates an example of the system with one radio transceiver in a handheld personal communication device.

FIG. 9 schematically illustrates an example of the system 2, 25, 30, 31 with one radio transceiver 4 in a handheld personal communication device 18.

In FIG. 9*a*) the radio transceiver 4 and a proximity component 6, such as a proximity component comprising one or more magnetic elements, are placed close together. No other radio transceivers 4 are between the proximity component 6 and the transceiver 4. The transceiver 4 is broadcasting a unique identification signal.

In FIG. 9*b*) the external device 10, e.g. a smartphone, tablet or PDA, starts a computer program application 8 that measures the magnetic field strength and/or direction, and calculates e.g. the absolute strength of the field, from the magnetic device 6. The computer program application may also continuously measure the signal strength of broadcasted radio signals send by nearby transceivers. The magnetic strength is measured and stored in the device memory of the external device.

In FIG. 9*c*) the external device 10 is introduced into the magnetic field surrounding the magnetic device 6. Logic on the computer program application running on the external device concludes that external device is in proximity to the proximity component, i.e. the magnetic device.

In FIG. 9*d*) the external device initiates communication with the transceiver, if the computer program application determines that the identification broadcasted from the device associated with the transceiver 4 is acceptable or approved.

In FIG. 9*e*), the external device may be removed from the magnetic device, but may still remain connected to communicate with the radio transceiver.

As is evident from the above, even though not explicitly shown in the drawing, the external device may in this and any other embodiment comprise a device storage and a processor. Likewise, when reference is made to a radio transceiver, inherently also an antenna for such transceiver, as well as a circuit or a processor for controlling the transceiver is disclosed. Thus, when an external device is configured to connect to a radio transceiver of the system, inherently, the antenna of the radio transceiver in the external device is configured to connect to an antenna of the radio transceiver in the system, to thereby establish a connection between the two transceivers.

The radio transceiver 4 may be present in a handheld personal communication device 18 functioning as a payment terminal by means of a payee computer application program in the handheld personal communication device 18, such as a smart phone, tablet etc.

Figure 10:
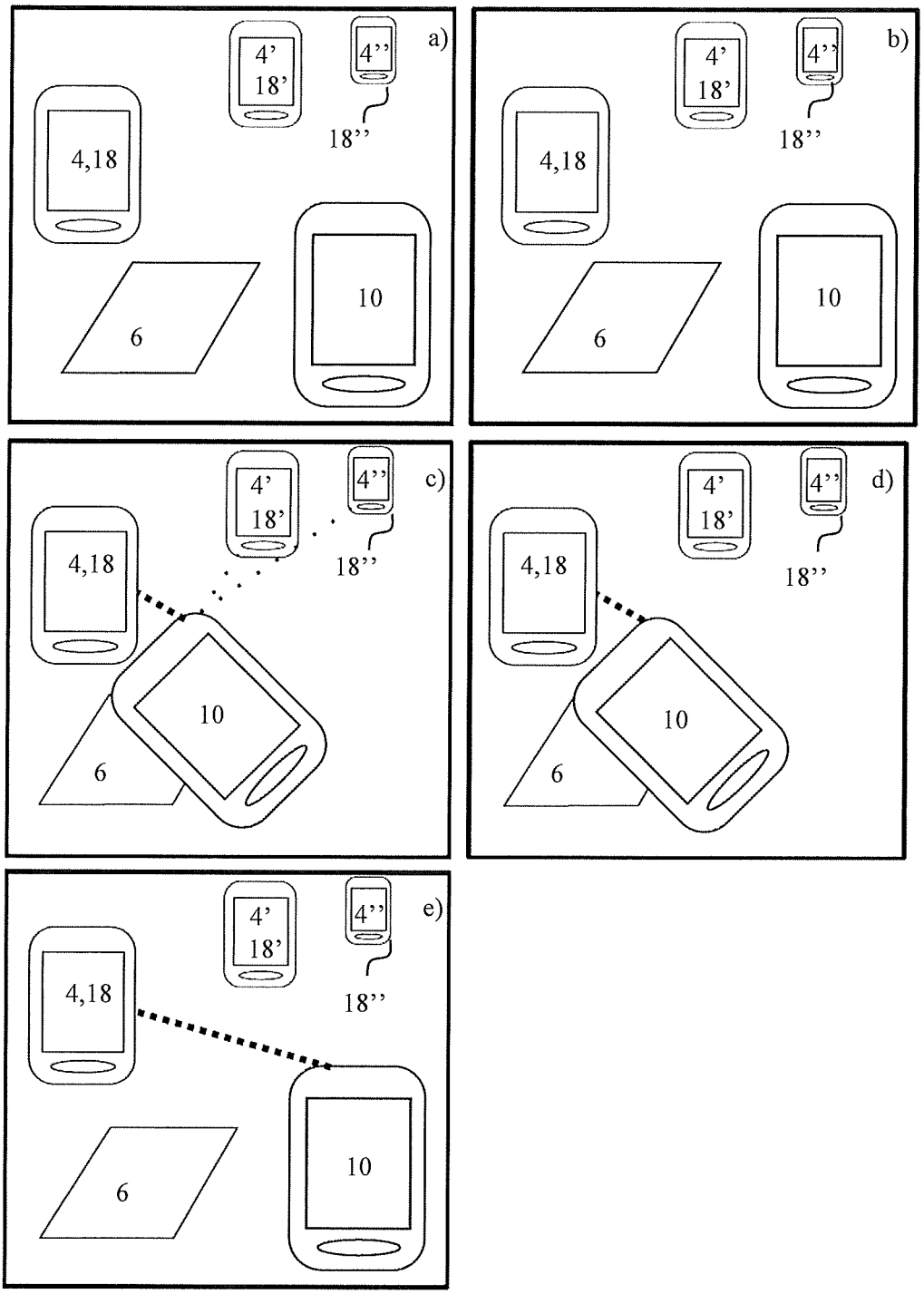
FIG. 10 schematically illustrates an example of the system with radio transceivers in a number of handheld personal communication devices.

FIG. 10 schematically illustrates an example of the system 2, 25, 30, 31 with more radio transceivers 4, 4', 4" in handheld personal communication devices 18, 18', 18".

The system comprises a plurality of radio transceivers and a corresponding plurality of proximity components. The computer program application is then configured to select a specific radio transceiver based on a broadcast signal strength evaluation or based on a user input to the computer program application selecting the specific radio transceiver. At least some of the plurality of radio transceivers is distributed within range of at least one of the radio transceivers. The external device is configured to initiate communication with the at least one radio transceiver having a broadcast signal higher than other available broadcast signals.

In FIG. 10*a*) a radio transceiver 4 and a proximity component 6, such as a magnetic device, are placed or positioned close together. Multiple other transceivers 4', 4" and proximity components 6', 6" are placed nearby. The transceiver 4 is broadcasting a unique identification signal.

In FIG. 10*b*) the external device 10, e.g. a smartphone, tablet or PDA, starts a computer program application 8 that e.g. measures the magnetic field strength and/or direction, and calculates the absolute strength of the field from the magnetic device 6. The computer program application also continuously measures the signal strength of broadcasted radio signals send by nearby transceivers 4', 4". The magnetic field strength is measured and stored in the devices memory of the external device.

It should be envisaged that the external device 10 may start the computer program application in response to a user input, or the external device 10 may be prompted to start the computer program application upon launch of another computer program application.

In FIG. 10*c*) the external device is introduced into the magnetic field surrounding the magnetic device 6. Logic on the computer program application running on the external device concludes that the external device is in proximity to the proximity component, i.e. the magnetic device.

In FIG. 10*d*) the external device initiates communication with the transceiver 4 broadcasting with the highest signal strength and with acceptable broadcasted identification, if the computer program application determines that the identification broadcasted from the transceiver 4 is acceptable or approved.

In FIG. 10*e*) the external device may be removed from the magnetic device, but may still remain connected to communicate with the connected radio transceiver 4.

In some events, the computer program application as disclosed herein may be embedded in another computer program application.

The radio transceivers 4, 4', 4" may be present in handheld personal communication devices 18, 18', 18" functioning as payment terminals by means of a payee computer application program in each handheld personal communication device 18, 18', 18", such as smart phones, tablets etc.

Although particular features have been shown and described, it will be understood that they are not intended to limit the claimed invention, and it will be made obvious to those skilled in the art that various changes and modifications may be made without departing from the scope of the claimed invention. The specification and drawings are, accordingly to be regarded in an illustrative rather than restrictive sense. The claimed invention is intended to cover all alternatives, modifications and equivalents.

The invention claimed is:

1. A system for initiating communication, comprising:
    at least one radio transceiver configured for short range communication;
    a proximity component; and
    an external device of a user comprising a computer program application,
    wherein the radio transceiver is configured to communicate with the computer program application,
    wherein the proximity component is configured to be identified by the external device,
    wherein the external device, upon identifying the proximity component, is configured to initiate communication with the radio transceiver enabling exchange of data verifying one or more electronic objects associated with the user of the external device, the computer program application, or the external device, and
    wherein the external device, upon identifying the proximity component, is configured to initiate exchange of data with an online service using a broadcast identification signal from the radio transceiver having the highest broadcast signal strength.

2. A system according to claim 1, wherein the proximity component is identified by the external device, when a signal and/or field strength caused by the proximity component as measured by a proximity sensor in the external device reaches a signal and/or field strength detection threshold.

3. A system according to claim 2, wherein the signal and/or field strength detection threshold is an absolute threshold value or wherein the signal and/or field strength detection threshold is determined as a relative change in signal and/or field strength obtained within a predefined time interval.

4. A system according to claim 1, wherein the system comprises a plurality of radio transceivers and a corresponding plurality of proximity components, and wherein the computer program application selects a specific radio transceiver based on a broadcast signal strength evaluation or based on a user input to the computer program application selecting the specific radio transceiver.

5. A system according to claim 1, wherein the proximity component is a passive proximity component, such as a passive proximity component having self-contained physical properties, such as a static proximity component, wherein the proximity component comprises one or more magnetic elements having magnetic properties, and/or wherein the proximity component has a magnetic surface.

6. A system according to claim 5, wherein the external device measures a field caused by the one or more magnetic elements including the strength and/or direction of the magnetic field.

7. A system according to claim 5, wherein the proximity sensor is a magnetometer.

8. A system according to claim 1, wherein the system comprises a handheld personal communication device, where the radio transceiver is provided in the handheld personal communication device, and where the proximity component is provided in the handheld personal communication device or adjacent to the handheld personal communication device, and wherein a payee computer program application is provided in the handheld personal communication device for receiving exchange of payment data verifying one or more electronic objects associated with the user or the computer program application or the external device.

9. A system according to claim 8, wherein the proximity component provided adjacent to the handheld personal communication device is a magnet or magnetic material present adjacent to the handheld personal communication device, such as present in an attachable cover, in an adhesive label, and/or in an attachable accessory device.

10. A system according to claim 1, wherein the proximity component provided in the handheld personal communication device is a magnet or magnetic material present in a loudspeaker in the handheld personal communication device.

11. A system according to claim 1 comprising a plurality of radio transceivers, wherein at least some of the plurality of radio transceivers are being distributed within range of at least one of the radio transceivers.

12. A system according to claim 1, wherein the at least one radio transceiver is configured to broadcast a radio transceiver identification signal, and wherein the computer program application upon reception of the radio transceiver identification signal, is configured to confirm whether the radio transceiver identification signal corresponds to a pre-approved radio transceiver.

13. A system according to claim 1, wherein the radio transceiver is configured to communicate via a short range communication protocol including Bluetooth, Bluetooth Low Energy, ZigBee, ANT or Wi-Fi, WLAN, etc.

14. A system according to claim 1, wherein the electronic object includes one or more of the following: a transit ticket, an event ticket, a voucher, a coupon, a token, a monetary value, a monetary value in cryptographic currency, such as a bitcoin, a personal identification of the user, including a passport, a personal, financial and/or medical identification of the user and/or of the computer program application and/or of the external device and/or of another computer program application associated with the external device.

15. A method for initiating communication between a system and an external device, the system comprising at least one radio transceiver and a proximity component and a computer program application, the computer program application being provided in the external device of a user, the radio transceiver being configured to communicate with the computer program application, and the proximity component being configured to be identified by the external device, the method comprising:
  positioning the external device in proximity to the proximity component;
  identifying, by the external device, the proximity component;
  initiating communication, upon identification of the proximity component, between the external device and the radio transceiver; and
  enabling exchange of data between the external device and the radio transceiver verifying one or more electronic objects associated with the user of the external device, the computer program application, or the external device,
  wherein the external device, upon identifying the proximity component, is configured to initiate exchange of data with an online service using a broadcast identification signal from the radio transceiver having the highest broadcast signal strength.

16. A nontransitory computer readable medium encoded with a computer program application configured to perform a process when executed by a processor in an external device of a user, the process comprising:
  receiving information on available radio transceivers configured for short range communication and signal strength of the available radio transceivers,
  continuously evaluating the signal strength of the available radio transceivers to identify an available radio transceiver with maximum signal strength,
  receiving sensor information,
  determining based on the received sensor information whether a proximity component is in proximity,
  upon determining that a proximity component is in proximity, selecting the available radio transceiver with maximum signal strength for initiating communication, and
  upon identifying the proximity component, initiating exchange of data with an online service using a broadcast identification signal from the radio transceiver having the highest broadcast signal strength.

17. A computer program application according to claim 16, wherein the computer program application receives a radio transceiver identification signal from each available radio transceiver, and wherein the computer application program is configured to confirm whether the radio transceiver identification signal corresponds to a pre-approved radio transceiver.

18. A computer program application according to claim 17, wherein the signal strength is evaluated for available and pre-approved radio transceivers and wherein a pre-approved radio transceiver with maximum signal strength is selected for initiating communication.

19. A computer program application according to claim 16 wherein the available radio transceiver with maximum signal strength is selected immediately upon receiving proximity information.

* * * * *